United States Patent [19]
Bruckert et al.

[11] Patent Number: 4,742,451
[45] Date of Patent: May 3, 1988

[54] INSTRUCTION PREFETCH SYSTEM FOR CONDITIONAL BRANCH INSTRUCTION FOR CENTRAL PROCESSOR UNIT

[75] Inventors: William F. Bruckert, Hudson; Tryggve Fossum, Northboro; John A. DeRosa, Jr., Princeton; Richard E. Glackemeyer, Bolton; Allan E. Helenius, Westford; John C. Manton, Marlboro, all of Mass.

[73] Assignee: Digital Equipment Corporation, Maynard, Mass.

[21] Appl. No.: 612,621

[22] Filed: May 21, 1984

[51] Int. Cl.⁴ .............................................. G06F 9/42
[52] U.S. Cl. .................................................... 364/200
[58] Field of Search ................. 364/200 MS, 900 MS

[56] References Cited

U.S. PATENT DOCUMENTS

| | | | |
|---|---|---|---|
| 4,200,927 | 4/1980 | Hughes | 364/200 |
| 4,236,206 | 11/1980 | Strecker | 364/200 |
| 4,384,342 | 5/1983 | Imura et al. | 364/900 |
| 4,430,708 | 2/1984 | Isaman | 364/200 |
| 4,435,756 | 3/1984 | Potash | 364/200 |
| 4,439,827 | 3/1984 | Wilkes | 364/200 |
| 4,454,578 | 6/1984 | Matsumoto et al. | 364/200 |
| 4,471,433 | 9/1984 | Matsumoto | 364/200 |

Primary Examiner—Archie E. Williams, Jr.
Assistant Examiner—Florin Munteanu
Attorney, Agent, or Firm—Cesari and McKenna

[57] ABSTRACT

A central processor unit for a digital data processing system that processes prefetched instructions including a conditional branch instruction. The processor includes a fetch unit that has separate portions, one that retrieves operands and the other that retrieves instructions. When the fetch unit fetches a conditional branch instruction, it may continue to prefetch "branch not taken" instructions using the instruction fetch portion. The fetch unit initially uses the operand fetch portion to prefetch "branch taken" instructions. If it is determined that the branch is not taken, the prefetch operation is aborted, otherwise the prefetch operation is allowed to continue to provide the next instruction used by the processor.

16 Claims, 6 Drawing Sheets

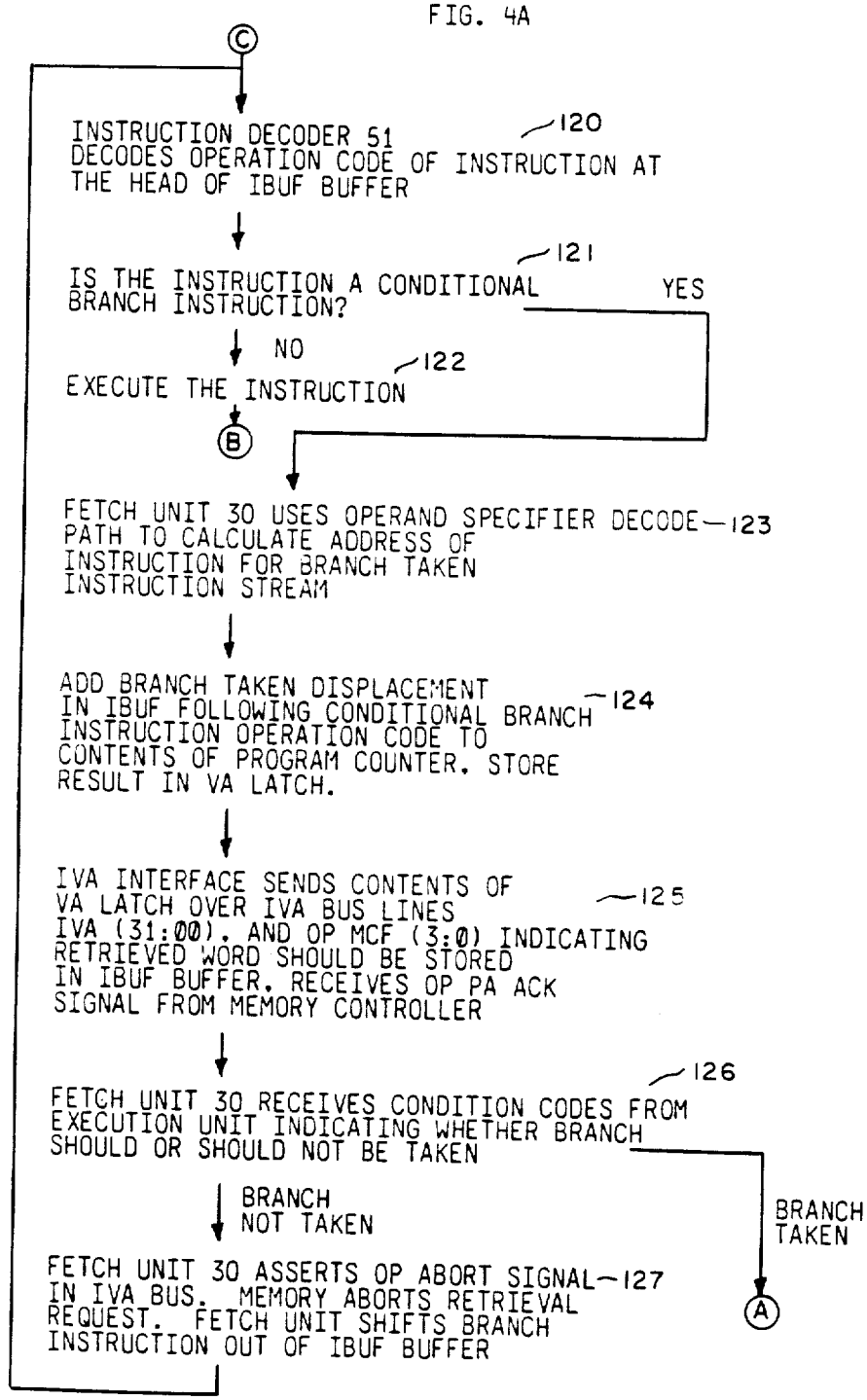

FIG. 4B (A)
↓

STORE CONTENTS OF VA LATCH IN —130
PROGRAM COUNTER

↓

CONTENTS OF VA LATCH ARE
INCREMENTED TO IDENTIFY NEXT —131
WORD IN BRANCH TAKEN
INSTRUCTION STREAM. RESULT IS
LOADED INTO VA LATCH AND VIBA LATCH

↓

MD INTERFACE TRANSMITS CONTENTS OF —132
VA LATCH ONTO IVA BUS IVA LINES (31:00),
AND OP MCF (3:0) SIGNALS INDICATING
RETRIEVED WORD SHOULD BE STORED IN IBUF
BUFFER. RECEIVES OP PA ACK SIGNAL
FROM MEMORY CONTROLLER

↓

FETCH UNIT MD INTERFACE RECEIVES MEMORY DATA
FROM MEMORY CONTROLLER OVER MD (31:00)
LINES. DEST CODE (1:0) INDICATING IBUF —133
DESTINATION

↓

MD INTERFACE LOADS DATA INTO IBUF, —134
AND ELIMINATES INSTRUCTION BYTES AHEAD
OF DATA IN IBUF FROM BRANCH NOT
TAKEN INSTRUCTION STREAM

↓

FETCH UNIT MD INTERFACE RECEIVES MEMORY —135
DATA FROM SECOND REFERENCE OVER
MD (31:00) LINES. DEST CODE (1:0) SIGNALS
INDICATING IBUF DESTINATION

↓

MD INTERFACE LOADS DATA INTO IBUF —136
BYTES FOLLOWING BYTES OCCUPIED BY
DATA FROM FIRST REFERENCE

WHEN IBUF BUFFER HAS ENOUGH
EMPTY BYTES TO WARRANT RETRIEVAL
FROM MEMORY, IVA INTERFACE PLACES —140
CONTENTS OF VIBA LATCH ONTO IVA (31:00)
LINES OF IVA BUS AND ASSERTS IBUF
REQ SIGNAL

↓

WHEN MEMORY CONTROLLER ACCEPTS REQUEST, IT —141
TRANSMITS IBF PA ACK SIGNAL AND RETRIEVES
REQUESTED DATA

↓

WHEN FETCH UNIT RECEIVES IBF PA ACK SIGNAL,
IT INCREMENTS CONTENTS OF VIBA LATCH TO
IDENTIFY NEXT WORD IN THE —142
INSTRUCTION STREAM

↓

WHEN MEMORY CONTROLLER HAS RETRIEVED
REQUESTED DATA, IT TRANSMITS IT ONTO
THE MD (31:00) LINES OF THE MD BUS AND —143
A DESTINATION CODE INDICATING THE IBUF
BUFFER AS THE DESTINATION

↓

MD INTERFACE LOADS RETRIEVED DATA —144
INTO EMPTY LOCATIONS IN IBUF BUFFER

↓
(C)

INSTRUCTION PREFETCH SYSTEM FOR CONDITIONAL BRANCH INSTRUCTION FOR CENTRAL PROCESSOR UNIT

CROSS REFERENCE TO RELATED PATENTS AND PATENT APPLICATIONS

U.S. Pat. No. 4,236,206, issued to William D. Strecker, et al, on Nov. 25, 1980 and entitled "Central Processor Unit For Executing Instructions Of Variable Length", which is incorporated herein by reference.

BACKGROUND OF THE INVENTION

I. Field of the Invention

The invention relates generally to the field of digital data processing systems, and more specifically to processors for use in such systems. The invention finds particular usefulness in processors which "prefetch", that is, which fetch instructions in an instruction stream while they are in the process of executing an instruction, the prefectched instruction being executed after the instruction being executed. The invention enables the processor to determine if an instruction is a conditional branch instruction, in which a determination is made as to whether a branch in an instruction stream should or should not be taken depending on the results of prior processing, and to prefetch both the instructions in the "branch taken" instruction stream as well as from the "branch not taken" instruction stream.

II. Description of the Prior Art

A digital data processing system generally includes three basic elements; namely, a memory element, an input/output element, and a processor element, all interconnected by one or more busses. The memory element stores data in addressable storage locations. This data includes both operands and instructions for processing the operands. The processor element causes data to be transferred or fetched, to it from the memory element, interprets the incoming data as either instructions or operands, and processes the operands in accordance with the instruction. The results are then stored in addressed locations in the memory element. An input/output element also communicates with the memory element in order to transfer data into the system and to obtain the processed data from it. The input/output elements normally operate in accordance with control information supplied to it by the processor element. The input/output elements may include, for example, printers, teletypewriters or keyboards and video display terminals, and may also include secondary data storage devices such as disk drives or tape drives.

Typically, a processor retrieves instructions in a stream from the memory element. The processor unit maintains a program counter which contains the address of the instruction being processed. After a current instruction is retrieved, the program counter can be incremented to contain the address of the location in memory which contains the next instruction in the instruction stream.

U.S. Pat. No. 4,236,206, issued to William D. Strecker, et al, on Nov. 25, 1980, discloses an improvement in which a single instruction may take a variable number of storage locations in the memory element. The central processor unit includes an instruction buffer into which retrieved words from the instruction stream are loaded. Generally, as the processor processes the portions of the instruction in the instruction buffer, they are shifted out and succeeding words are shifted up in the buffer. The processor prefetches instruction words in the instruction stream to keep the instruction buffer filled. When the processor finishes processing a current instruction, the prefetched words of the next instruction shift up in the buffer and are immediately available to the processor for processing after it has finished processing the current instruction. This prefetch enables the processor to process instructions more quickly.

A problem arises, however, if a branch instruction is encountered, which may require the processor to either continue processing instructions from the current stream or shift to another instruction stream. Some branches are unconditional.

Other branches are conditional, and the processor determines whether or not to shift to the alternate instruction stream depending on the state of the processor when the instruction is encountered. The processor, when it encounters an unconditional branch, can begin prefetching from the "branch taken" instruction stream immediately. However, a conditional branch presents the processor with a dilemma. It may continue prefetching from the current instruction stream, in which case if the branch is taken, the prefetched instructions will not be used. Contrariwise, it may prefetch instructions from the "branch taken" instruction stream, but if the branch is not taken then those instruction words will not be used. A third alternative is to disable instruction prefetching in response to a conditional branch instruction. All three alternatives can delay instruction processing at least sometimes.

SUMMARY OF THE INVENTION

The invention therefore provides an arrangement in which the central processor unit, in response to a conditional branch instruction, prefetches instructions from both the "branch taken" instruction stream, and the "branch not taken" instruction stream. The processor includes a fetch unit, which fetches operands to be processed. The fetch unit also prefetches instructions and performs a preliminary determination of the operation to be performed in executing the instruction, and in particular determines whether the instruction is a conditional branch instruction. An execution unit receives the operands from the fetch unit, processes the operands in response to the instruction, and transmits the processed operands back to the fetch unit, which stores the processed operands in the memory.

The fetch unit is divided into two sections, or "ports", one of which fetches instructions from the memory. The second section fetches operands from the memory. In response to a conditional branch instruction, the fetch unit determines the address of the "branch taken" instruction stream, and uses the operand fetch portion to begin prefetching instruction words from the "branch taken" instruction stream.

The execution unit transmits signals to the fetch unit indicating whether or not the branch is to be taken. If the branch is not taken, the fetch unit causes the memory to abort the "branch taken" instruction prefetch. If the execution unit informs the fetch unit that the branch is to be taken, the fetch unit allows the memory to complete the prefetch. The operand fetch portion of the fetch unit then transfers the address of the location of the "branch taken" instruction stream to the instruction prefetch portion, and the fetch unit then performs as before the conditional branch instruction, using the "branch taken" instruction stream.

BRIEF DESCRIPTION OF THE DRAWINGS

This invention is pointed out with particularity in the appended claims. The above and further objects and advantages of this invention may be better understood by referring to the following description taken in conjunction with the accompanying drawings, in which:

FIGS. 4A, 4B and 4C contain flow diagrams which are useful in understanding the operation of the central processing unit depicted in FIGS. 1 through 3.

DESCRIPTION OF THE PREFERRED EMBODIMENTS

Figure 1:
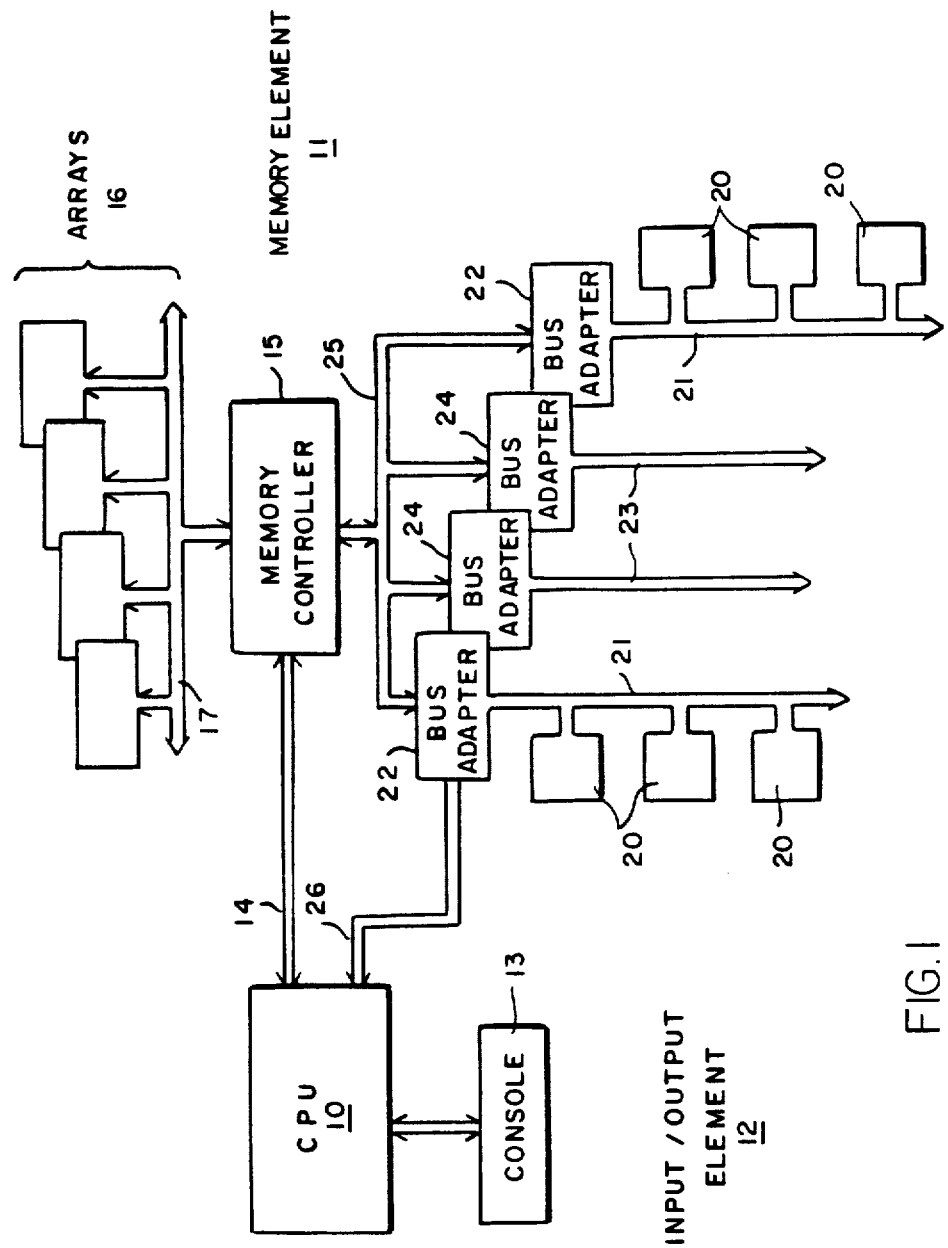
FIG. 1 is a block diagram of a digital processing system constructed in accordance with this invention.

As exemplified in FIG. 1, the basic elements of a data processing system including the invention comprise a central processor unit (processor) 10, a memory unit 11, and an input/output element 12. The processor 10 executes instructions that are stored in addressable storage locations in the memory unit 11. The instructions identify operations that are to be performed on operands, which are also stored in addressable locations in the memory unit. The instructions and operands are fetched by the processor 10 as they are needed, and processed data are returned to the memory unit. The processor 10 also transmits control information to units in the input/output element, enabling them to perform selected operations, such as transmitting data to or retrieving data from the memory unit 11. Such data may be instructions, operands which may be transmitted to the memory unit or processed data which is retrieved from the memory for storage or display.

An operator's console 13 serves as the operator's interface. It allows the operator to examine and deposit data, halt the operation of the central processor unit 10, or step the central processor unit through a sequence of instructions and determine the responses of the processor in response thereto. It also enables an operator to initialize the system through a boot strap procedure, and perform various diagnostic tests on the entire data processing system.

The central processor unit 10 is connected to the memory unit 11 through several buses generally identified by the reference numeral 14. Specifically, the central processor unit 10 is directly connected to a memory controller 15, which, in turn, connects to a plurality of arrays 16 over an array bus 17. In one specific embodiment, the memory controller also houses a cache memory. Memory controller 15 includes circuitry for retrieving the contents of an addressed location from either the cache or the array 16 and for storing information therein in a conventional manner. Cache memories are well-known in the art and will not be discussed further.

The data processing system may include several types of input/output units, including disk and tape secondary storage elements, teletypewriters, keyboards and video display terminals, and the like. These units 20 are connected through an input/output bus 21 to a bus adapter 22. The input/output bus 21 may be as described in U.S. Pat. No. 4,232,366, which was issued in the name of John V. Levy, et al, and assigned to the assignee of the present invention, the patent entitled "Bus For Data Processing System With Overlap Sequences". Other types of input/output buses may also be used to connect to similar input/output units (not shown), including an input/output bus 23, connected to a bus adapter 24, which may be as described in U.S. Pat. No. 3,815,099, issued June 4, 1974, in the name of J. Cohen et al, and entitled "Data Processing System".

The bus adapters 22 and 24 are connected to transmit and receive data from memory controller 15 over an adapter bus 25. The bus adapters are also connected by an interrupt request/grant bus 26, over which the bus adapters can interrupt the processing of central processor unit 10 in the event of a change of status of one or more of the input/output units 20 in a conventional manner. The central processing unit 10 thus transfers interrupt request grant signals directly with units in the input/output element, and transmits control information to, and receives status information from, the units in the input/output element 12 through memory controller 15. The memory controller thus controls the transfer of data to and from the central processing unit 10 and the input/output element 12, and the transfer of control and status information between the central processing unit and input/output element 12.

Figure 2:
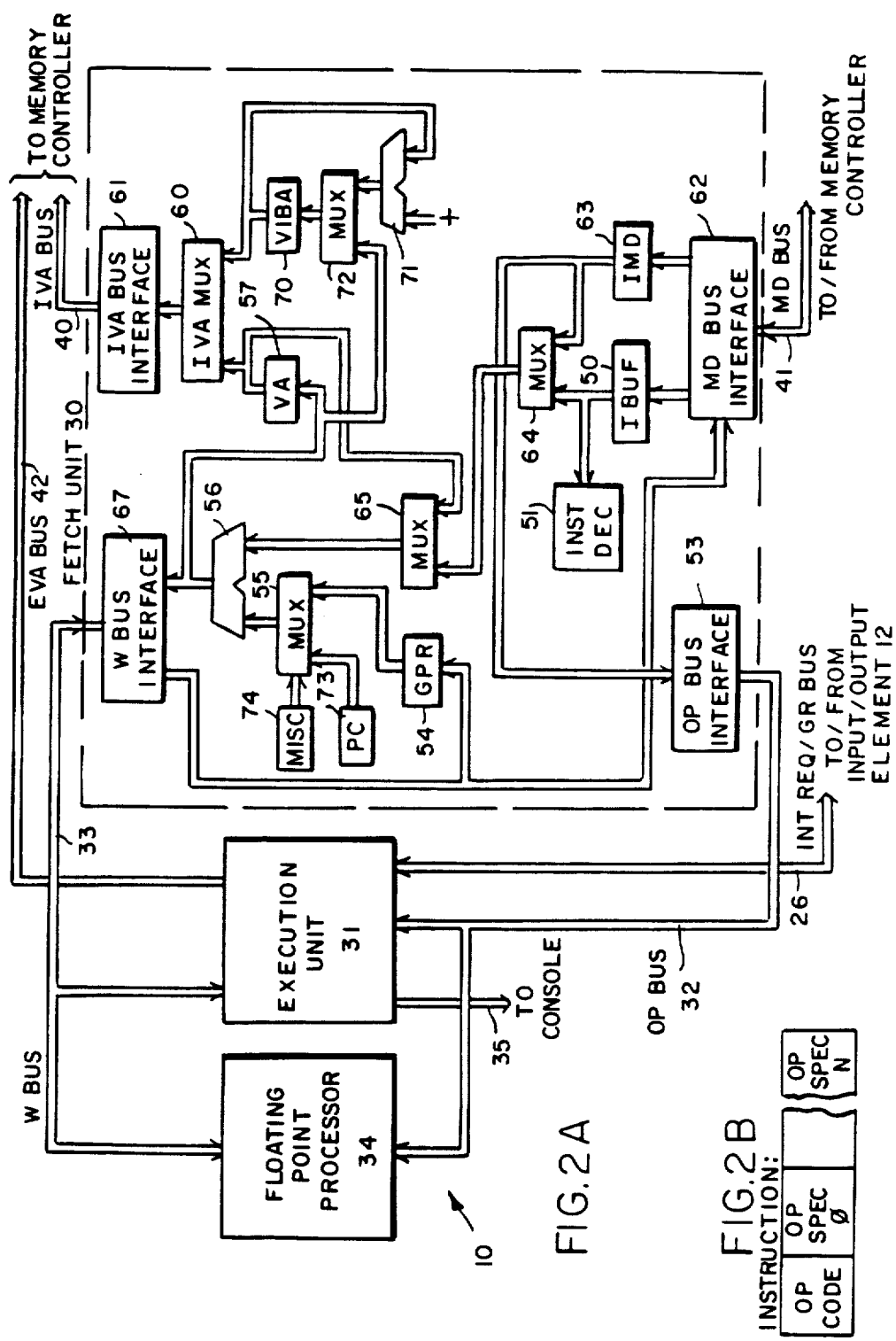
FIG. 2A is a block diagram of a central processor unit useful in the data processing system depicted in FIG. 1.
FIG. 2B depicts the structure of an instruction processed by the central processor unit shown in FIG. 2A.

FIG. 2 contains a general block diagram of the central processing unit 10. In brief, a fetch unit 30 fetches instructions and operands from the memory element 11, performs an initial decoding of the instruction operation code to determine the nature of the operation to be performed, and transmits signals identifying the operation and the operands to an execution unit 31 over an operand bus 32. The execution unit 31 transmits the processed data over a write bus 33 to the fetch unit 30, which, in turn, transmits them to the memory controller 15 for storage.

If an instruction is one of a certain well-known class of instructions called "floating point" instructions, the execution unit 31 enables a floating point processor 34 to process the operands. In that case, the floating point processor then transmits the processed data to the fetch unit for storage in the same manner as execution unit 31. The execution unit 31 is also connected to the console over a console bus 35, and to the interrupt request/grant bus 26 to receive interrupt requests from the input/output element and to grant interrupts in a well-known manner.

As has been mentioned, the fetch unit 30 fetches instructions and operands from the memory controller, and transmits processed data to the memory controller. The fetch unit 30 is connected to the memory controller over an IVA bus 40, over which it transmits virtual addresses to the memory controller, and by a memory data bus 41 over which it receives instructions and operands, and transfers the processed data to and from the memory controller. The memory controller includes circuitry (not shown) for translating virtual addresses to physical addresses in a conventional manner.

In addition, execution unit 31 is also connected to the memory controller over an EVA bus 42. In some circumstances, execution unit 31 transmits a virtual address to the memory controller 15 over EVA bus 42, and receive data from the memory over the memory data bus 41 and operand bus 32.

Before proceeding, it may be helpful to describe the structure of an instruction executed by one specific embodiment of central processing unit 10. The structure is identical to that of an instruction described in U.S. Pat. No. 4,236,206. In brief, an instruction is headed by an operation code or "OP CODE" which may be contained in one or two consecutive storage locations in the memory, followed by one or more operand specifiers. The number of operand specifiers depends on the nature of the operation specified in the operation code portion of the instruction.

As explained in detail in U.S. Pat. No. 4,236,206, each operand specifier may identify the operand to be processed in one of several addressing modes. In some modes, the operand specifier in the instruction may contain the operand itself. In other addressing modes, the operand may comprise or derive from the contents of a register in the fetch unit which is identified by the operand specifier. Alternatively, the operand may be stored in the memory at a location identified by or derived from the contents of a register identified by the operand specifier.

Fetch unit 30 includes an instruction buffer 50 which stores instruction words that have been fetched from memory element 11. An instruction decoder 51 decodes the OP CODE operation code portion of the instruction (FIG. 2B), determines the number of operand specifiers in the instruction, and proceeds to decode the operand specifiers one by one to obtain the operands. If the operand specifier contains the operand, the operand is shifted to an operand interface 53 for transmission to the execution unit 31 over operand bus 32. If the operand specifier identifies a register in the fetch unit 30, such as one of the general purpose registers 54, the contents of the identified register are also moved to the operand interface 53 for transmission over operand bus 32.

If the operand specifier indicates that one of the general purpose registers 54 contains the location in memory of the operand, it enables the contents of the identified register to be transmitted through a multiplexer 55, an arithmetic and logic unit 56, and stored in a VA (virtual address) latch 57. The contents of the VA latch are then coupled through an IVA multiplexer 60 and IVA bus interface 61 and transmitted onto IVA bus 40 to cause the memory controller 15 (FIG. 1) to retrieve the contents of the addressed location. When the memory controller has retrieved the contents of the requested location, it transmits them onto memory data bus 41. The fetch unit 30 receives the data through a memory data (MD) bus interface 62, and loads it into an IMD memory data latch 63. If the data comprises the operand, the fetch unit 30 then transmits it to the execution unit 31 through operand bus interface 53 and the operand bus 32.

There are several other types of addressing mode also described in U.S. Pat. No. 4,236,206. In one mode, named "register deferred", an identified general purpose register contains an address in memory, which itself is an address of a location in which the operand is stored. In this case, two retrievals from memory 11 are required to obtain the operand. The results of the first memory access, which is stored in the IMD latch 63, is, in this case, not the operand, but the address in memory of the operand. Thus, the contents of IMD latch 63 are coupled through a multiplexer 64, and a second multiplexer 65, and through arithmetic and logic unit 56 and stored in virtual address latch 57. The IVA bus interface 61 then receives the contents of latch 57 through multiplexer 60, and initiates the second memory retrieval, which results in the memory transmitting the operand to the fetch unit 30 over the memory data bus 41. The operand is then stored in IMD latch 63 and coupled through interface 53 onto operand bus 32 to the execution unit 31 as described above.

In another addressing mode, the operand specifier may contain a displacement value which is added to the contents of an identified general purpose register 54. The sum is either the address in memory of the operand or the address of the address of the operand if in a "deferred" mode. The displacement value is shifted from the instruction buffer through multiplexer 64 and 65, and added to the contents of the identified register in arithmetic and logic unit 56. The sum is then stored in virtual address latch 57 and the IVA bus interface 61 initiates a retrieval from memory 11 as described above. Here again, the operand is returned by the memory element 11 through interface 62 and stored in IMD memory data latch 63, before being shifted through operand bus interface 53 onto the operand bus 32 to execution unit 31.

As has been mentioned, fetch unit 30 not only retrieves operands for execution unit 31 and floating point processor 34, it also initiates transfers of processed data to memory. The execution unit and floating point processor transmit the processed data to the fetch unit 30 over write bus 33. The processed data may be stored in a general purpose register 54 or in the memory, depending on the value of an operand specifier in the instruction which defines the destination of the processed data. The fetch unit 30 receives the processed data from the write bus through an interface 67. If the destination of the processed data is a general purpose register, the data is coupled directly from interface 67 to the identified one of registers 54. If, on the other hand, the destination of the processed data is the memory unit 11, the data is coupled from interface 67 through memory data bus interface 62 to the destination location in memory unit 11.

Fetch unit 30 also includes circuitry that fetches instruction words for instruction buffer 50. As is described in U.S. Pat. No. 4,236,206, the instructions may be of different lengths. In one specific embodiment of this invention, the instruction words retrieved from memory are four bytes in length. An instruction may comprise one instruction word fetched from memory over memory data bus 41, or it may comprise more than one instruction word, or it may comprise a fractional number of instruction words.

Fetch unit 30 includes a VIBA virtual instruction buffer address latch 70 which stores the address of the next instruction word to be fetched from memory. When fetch unit 30 has processed a selected number of bytes in the instruction stream stored in instruction buffer 50 fetch unit 30 initiates a fetch of another instruction word. The contents of VIBA latch 70 are coupled through IVA multiplexer 60. The result is transmitted through IVA bus interface 61 onto IVA bus 40 to memory controller 15. Fetch unit 30 then increments the contents of the VIBA latch 70 by a constant indicated by (+) in an arithmetic and logic unit 71, and loads the result into VIBA latch 70 through a multiplexer 72. When the memory controller responds to the instruction word fetch, it transmits the data over memory data bus 41. The fetch unit receives the instruction word through memory data bus interface 62, for storage in instruction buffer 50.

The fetch unit also maintains a program counter register 73 the contents of which are the address in memory of the instruction, and specifically the address of the operation code (FIG. 2B) portion of the instruction. The fetch unit 30 keeps a record of the number of bytes processed for the operand specifiers for the instruction, as well as the number of bytes (typically one or two) comprising the operation code. After all of the operand specifiers have been decoded as explained above and in the aforementioned U.S. Pat. No. 4,236,206, the number of operand specifier bytes and operation code bytes that are processed in a current instruction is added to the contents of the program counter 73, the sum resulting in the address of the next instruction in memory unit 11. The contents of the program counter 73 are used as explained below.

It can be seen that the fetch unit 30 includes two portions, one of which decodes the operand specifiers, fetches the operands from and stored processed data in memory unit 11. This portion includes virtual address latch 57, arithmetic and logic unit 56, multiplexers 55, 64 and 65, registers 54, buffers 50 and 63, and instruction decoder 51. The second portion of the fetch unit retrieves instruction words from memory unit 11. This portion includes VIBA virtual instruction buffer address latch 70, multiplexer 72 and arithmetic and logic unit 71.

In accordance with the invention, when the instruction decoder 51 decodes a conditional branch instruction, fetch unit 30 uses the operand decode and fetch portion, specifically virtual address latch 57, multiplexer 65, and arithmetic and logic unit 56, to initiate a prefetch of the "branch taken" instruction stream.

In one specific embodiment of the invention, a conditional branch instruction includes an operand specifier which comprises a displacement value which, when added to the contents of the program counter, results in the address of the first instruction in the "branch taken" instruction stream. Thus, to determine the address of the first instruction in the "branch taken" instruction stream, the fetch unit 30 couples the contents of program counter register 73 through multiplexer 55 to one input to arithmetic and logic unit 56. The displacement value from instruction buffer 50 is coupled through multiplexers 64 and 65 the other input of the arithmetic and logic unit. The values at the inputs of arithmetic and logic unit 56 are added together and the result, the address of the first instruction in the "branch taken" instruction stream, is stored in virtual address latch 57. The IVA bus interface 61 then transmits a memory request over IVA bus 40 to memory controller 15 which initiates a retrieval of the first instruction in the "branch taken" instruction stream.

At this point, the execution unit 31 is finishing processing the previous instruction, the results of which determines whether or not the branch is to be taken.

Specifically, execution unit 31 transmits condition codes to fetch unit 30 when it has finished processing the instruction which is next previous to a conditional branch instruction. The fetch unit 30 determines whether the branch is to be taken based on the condition codes. If the branch is not to be taken, the fetch unit 30 transmits a signal to the memory which causes the memory to abort the "branch taken" retrieval operation. However, if the condition codes indicate that the branch is to be taken, the fetch unit allows the memory controller 15 to complete the "branch taken" retrieval operation, and the first instruction word from the "branch taken" instruction stream is received by the fetch unit over memory data bus 41 and through memory data bus interface 62 and loaded into instruction buffer 50. Any instruction words from instruction buffer 50 from the old instruction stream are then overwritten by the new instruction word.

Meanwhile, the contents of the virtual address latch 57 are incremented to identify the location of the second instruction word in the new instruction stream. The contents of virtual address latch 57 are shifted through multiplexer 65 to one input of arithmetic and logic unit 56. A constant value from one of miscellaneous constants 74 is coupled through multiplexer 55 to the other input of arithmetic and logic unit 56, where they are added together. The result is the address of the second instruction word in the "branch taken" instruction stream, and is loaded in both virtual address latch 57 and, through multiplexer 72, VIBA virtual instruction buffer address latch 70. The contents of virtual address latch 57 are coupled through multiplexer 60 to the IVA bus interface 61, which performs a second "branch taken" instruction word fetch. The fetched instruction word is again stored in the instruction buffer 50. The contents of the VIBA latch 70 are then incremented in arithmetic and logic unit 71 to identify the third instruction word in the "branch taken" instruction stream. Future fetches of "branch taken" instruction words are performed using addresses from VIBA latch 70 in the manner described above.

Figure 3:
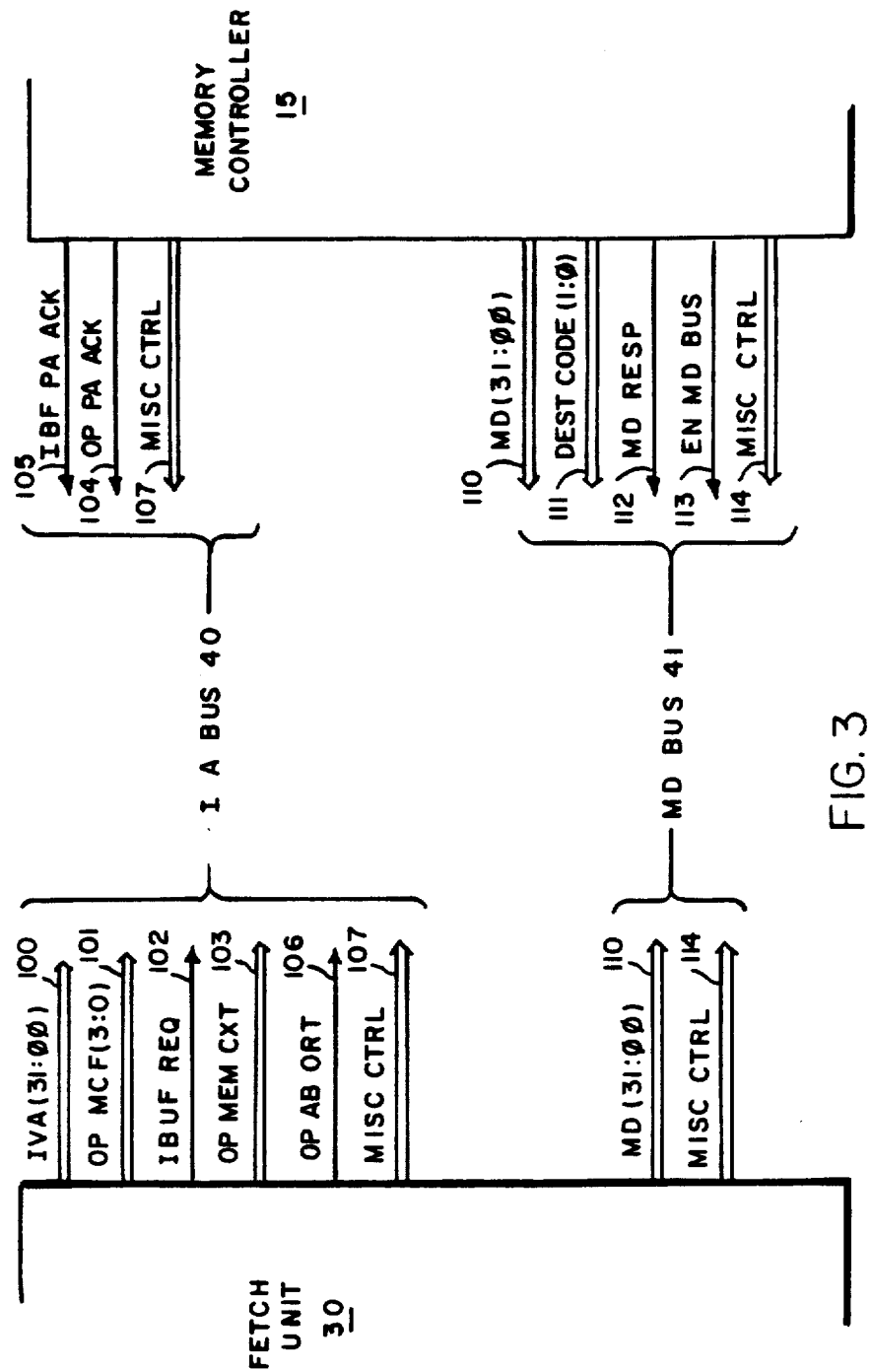
FIG. 3 is a diagram depicting the signals transmitted between a fetch unit of the central processing unit depicted in FIG. 2, and a memory controller in the data processing system depicted in FIG. 1.

At this point, it will be helpful to describe the various signals transmitted between fetch unit 30 and memory controller 15. With reference to FIG. 3, when the fetch unit initiates a memory operation, it transmits a virtual address onto IVA (31:00) lines 100 to memory controller 15. Depending on the source of the virtual address, whether from virtual address latch 57 (FIG. 2A) or VIBA latch 70, it will transmit OP MCF (3:0) operand memory control field signals on lines 101, or an IBUF REQ instruction buffer request signal on line 102. The OP MCF signals are transmitted if the source of the virtual address is virtual address latch 57, and is a command to memory controller 15 indicating whether data is to be sent to fetch unit 30 by the memory controller 15 (that is, the transfer is a read transfer), or to memory controller 15 (that is, the transfer is a write transfer), over memory data bus 41. Further, the OP MCF signals indicate, on a read transaction, whether the data are to be loaded into IMD latch 63 or instruction buffer 50. The OP MCF signals will specify that the data are to be loaded into instruction buffer 50 only if the fetch is in response to a conditional branch instruction as described above.

The IBUF REQ signal is transmitted by bus interface 61 (FIG. 2A) when the source of the virtual address signals transmitted over IVA lines 100 is the VIBA latch 70. In this case, the transfer is always a read transfer, and the returned instruction word is stored in instruction buffer 50.

If the source of the virtual address transmitted onto lines 100 is virtual address latch 57, interface 61 also transmits OP MEM CXT operand memory context signals onto lines 103 which indicate the number of data bytes to be transmitted to or from memory control 15.

In response to a virtual address on lines 100, and OP MCF signals or an IBUF REQ signal, the memory controller 15 will transmit one of two confirmation signals to fetch unit 30 if it is able to successfully translate the virtual address into physical address and complete the transfer. (The use of virtual addresses, and translation of a virtual address to a physical address, are well-known in the art and will not be discussed further herein. See, for example, U.S. Pat. No. 3,854,126, issued to Robert C. Gray, et al, on Dec. 10, 1974, and entitled "Circuit For Converting Virtual Addresses Into Physical Addresses.") The confirmation signal returned by memory controller 15 depends on whether the source of the virtual address signals is virtual address latch 57 or VIBA latch 70. If the source of the address signals is virtual address latch 57, the memory controller 15 transmits an OP PA ACK operand physical address acknowledgement signal on a line 104. However, if the source of the address signals is VIBA latch 70, memory controller 15 transmits an IBF PA ACK instruction buffer physical address acknowledgement signal on a line 105.

Following the receipt of the OP PA ACK confirmation signal on line 104, if the OP MCF command signals indicate a read transaction, and the fetched word was to be stored in instruction buffer 50, fetch unit 30 may transmit an OP ABORT signal on line 106. This will occur if the execution unit 31 transmits condition codes to fetch unit 30 specifying that the branch is not to be taken. The OP ABORT signal will cause memory controller 15 to abort the memory reference from virtual address latch 57.

The IVA bus 40 also includes lines 107 for carrying a number of miscellaneous timing and control signals which are conventional and not necessary for an understanding of the invention.

Memory data bus 41 contains lines 110 over which memory data signals (31:00) are transmitted between the fetch unit 30 and memory controller 15. In addition, memory control 15 transmits destination code (1:0) signals over lines 111 to fetch unit 30. These signals identify instruction buffer 50 or IMD latch 63 as the destination of the memory data signals being transmitted from the memory controller to the fetch unit. An MD RESP response signal is transmitted over a line 112 as a timing signal which enables the fetch unit 30 to strobe the signal into the identified destination buffer 50 or 63. An EN MD BUS signal carried by a line 113 enables the fetch unit 30 to transmit data signals over lines 110. Finally, memory data bus 41 also includes lines 114 for carrying miscellaneous timing and control signals.

FIGS. 4A, 4B and 4C depict flow diagrams which describe in detail the steps performed, primarily by fetch unit 30, in response to a conditional branch instruction. First the instruction decoder 51 decodes an instruction in the instruction buffer 50 (step 120). If the operation code indicates that the instruction is not a conditional branch instruction (step 121), the instruction decoder 51 enables the remainder of central processor unit 10 to execute the instruction (step 122). If, however, the operation code specifies a conditional branch, the operand specifier decode portion of fetch unit 30 proceeds to calculate the address of the first instruction in the "branch taken" instruction stream (step 123).

In calculating the address of the first instruction of the "branch taken" instruction stream, the contents of program counter 73 (FIG. 2A) are coupled through multiplexer 55 to one input of arithmetic and logic unit 56 (step 124). The value in the operand specifier portion of the conditional branch instruction is shifted from the instruction buffer 50 through multiplexers 64 and 65 to the other input of arithmetic and logic unit 56. Arithmetic and logic unit 56 then adds the two values together and stores the result in virtual address latch 57 (step 124). At this point, the address of the first instruction word in the "branch taken" instruction stream is stored in virtual address latch 57, and the address of the next instruction word in the "branch not taken" instruction stream is stored in VIBA latch 70.

Since instruction decoder 51 has indicated that the instruction currently being processed is a conditional branch instruction, when the address of the instruction word in the "branch taken" instruction stream is stored in virtual address latch 57, the IVA bus interface 61 initiates an instruction fetch using that address which the execution unit 31 is in the process of executing the instruction next previous to the conditional branch instruction. The fetch unit 30 need not wait until there are sufficient locations in the instruction buffer 50 to warrant performing the retrieval, as it would with an instruction fetch using an address in VIBA latch 70, since, if the branch is taken, the contents of the instruction buffer 50 will be overwritten with the fetched "branch taken" instruction word. An instruction fetch using an address in VIBA latch 70 does not cause any of the contents of instruction buffer 50 to be overwritten.

In performing the "branch taken" instruction word fetch, the IVA bus interface 61 transmits the contents of the VA latch 57 onto lines 100 (FIG. 3), an OP MCF (3:0) signal on lines 101 indicating that the operation is a read operation and that the fetched instruction word should be loaded into the instruction buffer 50, and an OP MEM CXT context field onto lines 103 indicating that an entire word is being retrieved (step 125). When the memory controller 15 receives these signals, it determines whether it can translate the virtual address and complete the fetch. If it is able to complete the fetch, it returns an OP PA ACK acknowledgement signal on line 104.

After the IVA bus interface 61 transmits the signals identified in step 125, the fetch unit 30 receives the condition codes from execution unit 31. The fetch unit determines from those condition codes whether the branch is or is not to be taken (step 126). More specifically, the execution unit 31 transmits the condition codes for each instruction to fetch unit 30. The fetch unit 30, when it encounters a conditional branch instruction, examines the condition codes when they are received, and makes the decision of whether or not the branch is to be taken. The fetch unit either allows the "branch taken" to continue or aborts it, and the execution unit 31 need never receive the conditional branch instruction or perform any action in response thereto.

If the condition codes indicate that the branch is not to be taken (step 126) the fetch unit asserts the OP ABORT signal on line 106 (FIG. 3). The memory controller 15 then aborts the "branch taken" retrieval request. The fetch unit then shifts the conditional branch instruction out of the instruction buffer 50 and proceeds to the next instruction (that is, it returns to step 120).

If, however, in step 126 the condition codes indicate that the branch is to be taken, a copy of the contents of the virtual address latch 57 is stored in program counter 73 (step 130). Thus, the program counter receives the address of the first instruction in the "branch taken" instruction stream, which is to be executed next. The contents of the VA latch are then incremented to identify the next instruction word in the "branch taken" instruction stream (step 131). The contents of the latch are coupled through multiplexer 65 to an input of arithmetic and logic unit 56. Multiplexer 55 selects a constant from miscellaneous inputs 74 for the other input to unit 56, which performs an addition. The results are stored both in virtual address latch 57 and in VIBA latch 70 through multiplexer 72. Thus, the address of the second instruction word in the "branch taken" instruction stream is stored in both VA latch 57 and VIBA latch 70.

The IVA bus interface 61 then transmits address signals from latch 57 onto lines 100 and appropriate command and length signals onto lines 101 and 103 (FIG. 3) to perform a second instruction word fetch (step 132).

Some time after the instruction word fetch request is transmitted in step 125, if no OP ABORT signal is transmitted by fetch unit 30 (step 127), the memory controller 15 prepares to transmit the first instruction word over memory data lines 110 (FIG. 3), and a destination code is transmitted onto lines 111 identifying the instruction buffer 50 (step 133). The memory data bus interface 62 receives the instruction word, stores it in the instruction buffer 50 (step 134) and shifts the newly-retrieved instruction word through the instruction buffer to the head of the buffer, thereby overwriting any instruction words in the buffer, all of which are from the "branch not taken" instruction stream. The memory controller later transmits the instruction word from the second retrieval request (which was initiated in step 132), and memory data bus interface 62 loads the instruction into the instruction buffer (step 36) following the first instruction word. After receiving the first instruction word (step 134) from the "branch taken" instruction stream, the fetch unit 30 begins processing the instruction (step 120, FIG. 4A) in a conventional manner. After initiating the second "branch taken" instruction fetch using the address in the VA latch 57, the fetch unit 30 thereafter fetches instructions from the "branch taken" instruction stream using the address in the VIBA latch 70.

As has been mentioned, except during a conditional branch "branch taken" instruction prefetch, fetch unit 30 normally uses the virtual address stored in VIBA latch 70 to obtain instruction words in an instruction stream. The sequence used by fetch unit 30 to obtain an instruction word using the contents of VIBA latch 70 is set forth in FIG. 4C. When the instruction buffer has enough empty storage locations to warrant an instruction word retrieval from the memory 11 (FIG. 1) the IVA bus interface 61 transmits the contents of VIBA latch 70 onto lines 100 of IVA bus 40, and asserts the IBUF REQ instruction buffer request signal on line 102 (step 140). When the memory controller 15 receives these signals, and if it is capable of translating the virtual address and performing the transfer, it transmits the IBF PA ACK acknowledgement (step 141) signal on line 105 (FIG. 3). When the fetch unit 30 receives the IBF PA ACK signal, it increments the contents of the VIBA latch using arithmetic and logic unit 71 (FIG. 2A) to identify the next word in the instruction stream (step 142).

When memory controller 15 has retrieved the instruction word, it transmits it as memory data signals on lines 110, along with a destination code identifying the instruction buffer 50 and the MD RESP response signal on line 112 (step 143). The fetch unit 30 then couples the instruction word signal from lines 110 through bus interface 62 (step 144) and stores the signals in vacant locations in the instruction buffer 50.

As has been mentioned, in the specific embodiment of fetch unit 30 depicted in FIG. 2A, when instruction decoder 51 identifies a conditional branch instruction, the fetch unit (a) calculates the address of the first instruction word in the "branch taken" instruction stream, (b) initiates a retrieval of the instruction word, (c) receives the condition codes from execution unit 31 from which it determines whether the conditional branch is to be taken or not to be taken, and (d) if the branch is not to be taken, transmits an abort signal to memory controller 15 to abort the retrieval request to avoid overwriting the contents of the instruction buffer 50. It is apparent that the timing of the steps can be significant since, if the condition codes are not received soon enough after step (b), the memory controller will respond with the instruction word with the first instruction from the "branch taken" instruction stream. In one specific embodiment, a signal is transmitted from execution unit 31 to fetch unit 30 which inhibits the fetch unit from initiating the retrieval of the instruction word from the "branch taken" instruction stream. The inhibiting signal is removed a predetermined time before the execution unit will send the condition codes from the execution of the next previous instruction to the fetch unit. The predetermined time is selected to ensure that the fetch unit will be able to cause the execution unit to abort the "branch taken" instruction fetch if the condition codes indicate to the fetch unit that the branch is not to be taken.

This problem can also be handled in two other ways. First, an additional buffer (not shown) can be included in fetch unit 30 into which the instruction word for the "branch taken" instruction stream is initially loaded. If the fetch unit 30 then determines that the branch is to be taken, it may transfer the contents of this buffer into the instruction buffer 50, and all subsequent instruction retrievals can also be loaded therein. Second, the fetch unit's memory data interface 62 can include circuitry that inhibits it from receiving the fetched "branch taken" instruction word from the memory data bus 41. Both of these arrangements will prevent the contents of the instruction buffer 50 from being overwritten by a "branch taken" instruction word transferred by the memory controller 15. However, both of these arrangements require additional circuitry, and therefore may increase cost. Furthermore, if the fetch unit can make the decision of whether or not to continue with the "branch taken" instruction fetch, allowing the memory controller to continue with the fetch after the decision is made can delay the memory controller in processing other fetches from memory that may have been initiated by the fetch unit 30 or execution unit 31.

The foregoing description has been limited to a specific embodiment of this invention. It will be apparent, however, that the invention can be practiced in data processing systems having diverse basic construction, or in systems that use different internal circuitry than is disclosed in this specification with the attainment of some or all of the advantages of the invention. Therefore, it is the object of the appended claims to cover all such variations and modifications as come within the true spirit and scope of the invention.

What is claimed as new and desired to be secured by Letters Patent of the United States is:

1. A fetch unit for use in a processor in a digital data processing system for fetching program instructions and operands from a memory, the memory including a plurality of addressable storage locations for storing program instructions from a first series of program instructions in a first series of successive storage locations, the instructions including a conditional branch instruction which enables the fetch unit to fetch from the memory program instructions from a second series of program instructions stored in a second series of storage locations in response to the occurrence of a predetermined condition in said processor, said fetch unit comprising:

A. A operand retrieval means for initiating the retrieval of operands from the memory, said operand retrieval means including means for calculating the address in memory of an operand;

B. instruction retrieval means for initiating the retrieval of instructions from the memory, said instruction retrieval means including means for calculating the address in memory of an instruction;

C. control means connected to said operand retrieval means and said instruction retrieval means and including means for receiving a signal from the processor indicating the presence or absence of a predetermined condition for controlling the operation thereof, said control means being responsive to the receipt of a conditional branch instruction to enable said operand retrieval means to initiate a retrieval from the memory of an instruction from the second series of program instructions in response to the processor indicating the occurrence of the predetermined condition; and D. interface means including:
  i. means for transmitting address, command and memory control signals to the memory, said command signals including signals for enabling the memory to transfer data signals, including instructions and operands, to said fetch unit, and said memory control signals including an abort signal, the memory not transmitting the contents of the addressed location to the fetch unit in response to the receipt of the abort signal;
  ii. means for receiving data signals from the memory, and
  iii. means responsive to the signal from the processor indicating the absence of the predetermined condition to enable the transmission of said abort signal to the memory.

2. A fetch unit as defined in claim 1 further comprising instruction buffer means for storing an instruction comprising an operation code and an operand specifier defining the location in memory of an operand, A. said operand retrieval address calculation means comprising:
  (i) means connected to said buffer means for decoding each operand specifier in the instruction to determine the address in memory of an operand, and
  (ii) operand address storage means connected to said decoding means for storing the decoded operand address, B. said control means including means responsive to the conditional branch instruction operation code when said instruction buffer contains a conditional branch instruction for enabling said operand retrieval address calculation means to decode the operand specifier of the conditional branch instruction and initiate the retrieval from the memory of an instruction from the second series of program instructions.

3. A fetch unit as defined in claim 2 in which the operand specifier of a conditional branch instruction constitutes the displacement in addressable storage locations from the conditional branch instruction to the second series of program instructions, wherein:

A. said operand retrieval means further includes a program counter register,

B. said control means includes:
  (i) means for enabling the contents of siad program counter register and said conditional branch instruction operand specifier to both be coupled to the operand retrieval means address calculation means, and
  (ii) means for enabling said operand retrieval means address calculation means to perform an additional using the contents of said program counter register and said conditional branch instruction operand specifier and storing the sum in said operand address storage means, and C. said operand retrieval means further including means for using the contents of said operand address storage means to initiate the retrieval of an instruction from said second series of instruction and storing the retrieved instruction in said instruction buffer means.

4. A fetch unit as defined in claim 3 wherein said instruction retrieval means further includes:

A. instruction address storage means for storing the address in memory of the next instruction in the first series of instructions;

B. means connected to said instruction address storage means for transmitting a request to the memory to initiate a retrieval of the contents of the storage location identified by the contents of said instruction address storage means, and C. said instruction address calculation means being connected to said instruction address storage means and said retrieval initiating means for incrementing the contents of said instruction address storage means when the contents of said instruction address storage means have been used in the initiation of a retrieval.

5. A fetch unit as defined in claim 4 further comprising coupling means connected to said operand retrieval means address calculation means and said instruction address storage means, said control means enabling said coupling means to couple the address of the second series of instructions for storage in said instruction address storage means when said instruction buffer stores a conditional branch instruction.

6. A fetch unit as defined in claim 3 wherein said control means further includes means for enabling the contents of said operand address storage means to be stored in said program counter in response to the predetermined condition in said processor.

7. A fetch unit as defined in claim 1 wherein said interface means further includes:

A. means for receiving an acknowledgment signal from the memory transmitted by the memory in response to its receipt of the address, command and memory control signals from said interface means, and B. means for receiving a response signal from the memory with the data signals which enables said interface means to receive the data signals.

8. A central processor unit for connection to a memory unit for forming a digital data processing system, the memory including a plurality of addressable storage locations for storing program instructions in a series of successive storage locations and operands for use in processing the instructions, one of the instructions comprising a conditional branch instruction which enables the central processor unit to process program instructions from a second series of storage locations in response to the occurence of a predetermined condition in said central processor unit, said central processor unit comprising:

A. a buffer for storing instructions that have been retrieved from the memory unit, said buffer including a mulitiple-location storage buffer and instruction buffer control means connected to said processing means for eliminating instructions remaining in said storage buffer from said first set of instructions following said conditional branch instruction in response to the occurrence of the predetermined condition;

B. processing means connected to said control means for determining in response to the occurrence or absence of the predetermined condition, whether the branch is or is not to be taken;

C. instruction retrieval means for initiating the retrieval of program instructions from said first set of storage locations for storage in said instruction buffer;

D. operand retrieval means for initiating the retrieval of operands from the memory unit; and E. control means connected to said buffer, said instruction retrieval means and to said operand retrieval means for controlling the operation thereof, said control means being responsive to a conditional branch instruction in said buffer for enabling said operand retrieval means to initiate the retrieval of program instructions from the second set of instructions storage locations for storage in said instruction buffer or disabling an instruction fetch by said operand retrieval means if said processing means determines that the branch is not to be taken.

9. A central processor unit as defined in claim 8 wherein the operand retrieval means and the instruction retrieval means both include means for calculating the address in memory of a respective operand or instruction.

10. A central processor unit as defined in claim 9 wherein:

A. an instruction stored in said buffer comprises an operation code and an operand specifier defining the location in memory of an operand, B. said operand retrieval address calculation means comprises:
 (i) means for decoding each operand specifier in the instruction to determine the address in memory of an operand, and
 (ii) means connected to said decoding means for storing the decoder operand address, and C. said control means includes means responsive to the conditional branch instruction operation code when said instruction buffer contains a conditional branch instruction for enabling said operand retrieval address calculation means to decode the operand specifier of the conditional branch instruction and initiate the retrieval from the memory of an instruction from the second series of program instructions.

11. A central processor unit as defined in claim 10 in which the operand specifier of a conditional branch instruction constitutes the displacement in addressable storage locations from the conditional branch instruction to the second series of storage locations, wherein:

A. said operand retrieval means further includes a program counter register,

B. said control means includes:
 (i) means for enabling the contents of said program counter and said conditional branch instruction operand specifier to both be coupled to the operand retrieval means address calculation means, and
 (ii) means for enabling said operand retrieval means address calculation means to perform an addition using the contents of said program counter register and said conditional branch instruction operand specifier and storing the sum in said operand address storage means, and C. said operand retrieval means further including means for using the contents of said operand address storage means to initiate the retrieval of an instruction from said second series of storage locations and storing the retrieved instruction in said instruction buffer means.

12. A central processor unit as defined in claim 11 wherein said instruction retrieval means further includes:

A. instruction address storage means for storing the address in memory of the next instruction in the first series of instructions;

B. means connected to said instruction address storage means for transmitting a request to the memory to initiate a retrieval of the content of the storage location identified by the contents of said instruction address storage means, and C. said instruction address calculation means being connected to said instruction address storage means and said retrieval initiating means for incrementing the contents of said instruction address storage means when the contents of said instruction address storage means have been used in the inititation of a retrieval.

13. A central processor unit as defined in claim 12 further comprising coupling means connected to said operand retrieval means address calculation means and said instruction address storage means, said control means enabling said coupling means to couple the address of the second series of instructions for storage in said instruction address storage means when said instruction buffer stores a conditional branch instruction.

14. A central processor unit as defined in claim 11 wherein said control means further includes means for enabling the contents of said operand address storage means to be stored in said program counter in response to the predetermined condition in said processor.

15. A central processor unit as defined in claim 9 further including interface means including:

A. means for transmitting address, command and memory control signals to the memory, said command signals including signals for enabling the memory to transfer data signal, including instructions and operands, to said fetch unit, and said memory control signals including an abort signal, the memory not transmitting the contents of the addressed location to the fetch unit in response to the receipt of the abort signal, B. means for receiving data signals from the memory, and C. means responsive to processor detecting the absence of the predetermined condition to enable the transmission of said abort signal by said interface means to the memory.

16. A central processor unit as defined in claim 15 wherein said interface means further includes:
A. means for receiving an acknowledgment signal from the memory transmitted by the memory in response to its receipt of the address, command and memory control signals from said interface means, and
B. means for receiving a response signal from the memory with the data signals which enables said interface means to receive the data signals.

* * * * *